(12) United States Patent
Tu et al.

(10) Patent No.: US 11,455,575 B1
(45) Date of Patent: Sep. 27, 2022

(54) SYSTEM AND METHODS FOR MESH ARCHITECTURE FOR HIGH BANDWIDTH MULTICAST AND BROADCAST NETWORK

(71) Applicant: Marvell Asia Pte, Ltd. (Registration No. 199702379M), Singapore (SG)

(72) Inventors: Dan Tu, San Mateo, CA (US); Enrique Musoll, San Jose, CA (US); Chia-Hsin Chen, Santa Clara, CA (US); Avinash Sodani, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 335 days.

(21) Appl. No.: 16/864,031

(22) Filed: Apr. 30, 2020

(51) Int. Cl.
*G06N 20/00* (2019.01)
*G06F 13/28* (2006.01)
*G06F 13/40* (2006.01)

(52) U.S. Cl.
CPC ........... *G06N 20/00* (2019.01); *G06F 13/28* (2013.01); *G06F 13/4027* (2013.01)

(58) Field of Classification Search
None
See application file for complete search history.

(56) References Cited

U.S. PATENT DOCUMENTS

| | | | |
|---|---|---|---|
| 8,271,701 B1 | 9/2012 | Nguyen et al. | |
| 8,897,315 B1 | 11/2014 | Arad et al. | |
| 9,007,902 B1 | 4/2015 | Medina | |
| 9,807,027 B2 | 10/2017 | Shumsky et al. | |
| 9,886,273 B1 | 2/2018 | Eldar et al. | |
| 9,900,903 B1 | 2/2018 | Rottenstreich | |
| 10,200,313 B2 | 2/2019 | Zemach et al. | |
| 2003/0035372 A1 | 2/2003 | Schaub | |
| 2007/0297366 A1* | 12/2007 | Osann | H04W 40/06 370/331 |
| 2014/0068205 A1 | 3/2014 | Mayhew et al. | |
| 2014/0314099 A1* | 10/2014 | Dress | H04L 49/15 370/422 |
| 2015/0221358 A1 | 8/2015 | Brandl | |

* cited by examiner

*Primary Examiner* — Idriss N Alrobaye
*Assistant Examiner* — Dayton Lewis-Taylor

(57) ABSTRACT

A multi-dimensional mesh architecture is proposed to support transmitting data packets from one source to a plurality of destinations in multicasting or broadcasting modes. Each data packet to be transmitted to the destinations carries a destination mask, wherein each bit in the destination mask represents a corresponding destination processing block in the mesh architecture the data packet is sent to. The data packet traverses through the mesh architecture based on a routing scheme, wherein the data packet first traverses in a first direction across a first set of processing blocks and then traverses in a second direction across a second set of processing blocks to the first destination. During the process, the data packet is only replicated when it reaches a splitting processing block where the paths to different destinations diverge. The original and the replicated data packets are then routed in different directions until they reach their respective destinations.

26 Claims, 2 Drawing Sheets

SYSTEM AND METHODS FOR MESH ARCHITECTURE FOR HIGH BANDWIDTH MULTICAST AND BROADCAST NETWORK

BACKGROUND

A hardware-based machine learning (ML) system typically includes multiple cores/subsystems (blocks and tiles), each having its own processing units and on-chip memory (OCM). The ML system needs to transmit and route data packets from a memory unit (a source), e.g., a DDR memory, to the processing tiles (destinations) so that the data can be processed by the processing units for various ML operations. Currently, most data routing systems optimize data packets routing based on one source—one destination pair, which is not suited to handle one source many destination (multicast) and/or one source—all destination (broadcast) problem encountered in the ML system wherein data packets often need to be transferred from the same/single memory unit to multiple or all OCMs of the processing tiles on a chip.

In some data routing systems, every router utilizes one or more first-in-first-out (FIFO) queues to preserve source/destination ordering of routed data packets. If a data packet is to be routed to multiple destinations, the data packet is replicated for each of the destinations and routed to these destinations in order. Such data packet replication, however, may result in unnecessary bandwidth usage throughout the system especially when the number of destinations is large.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
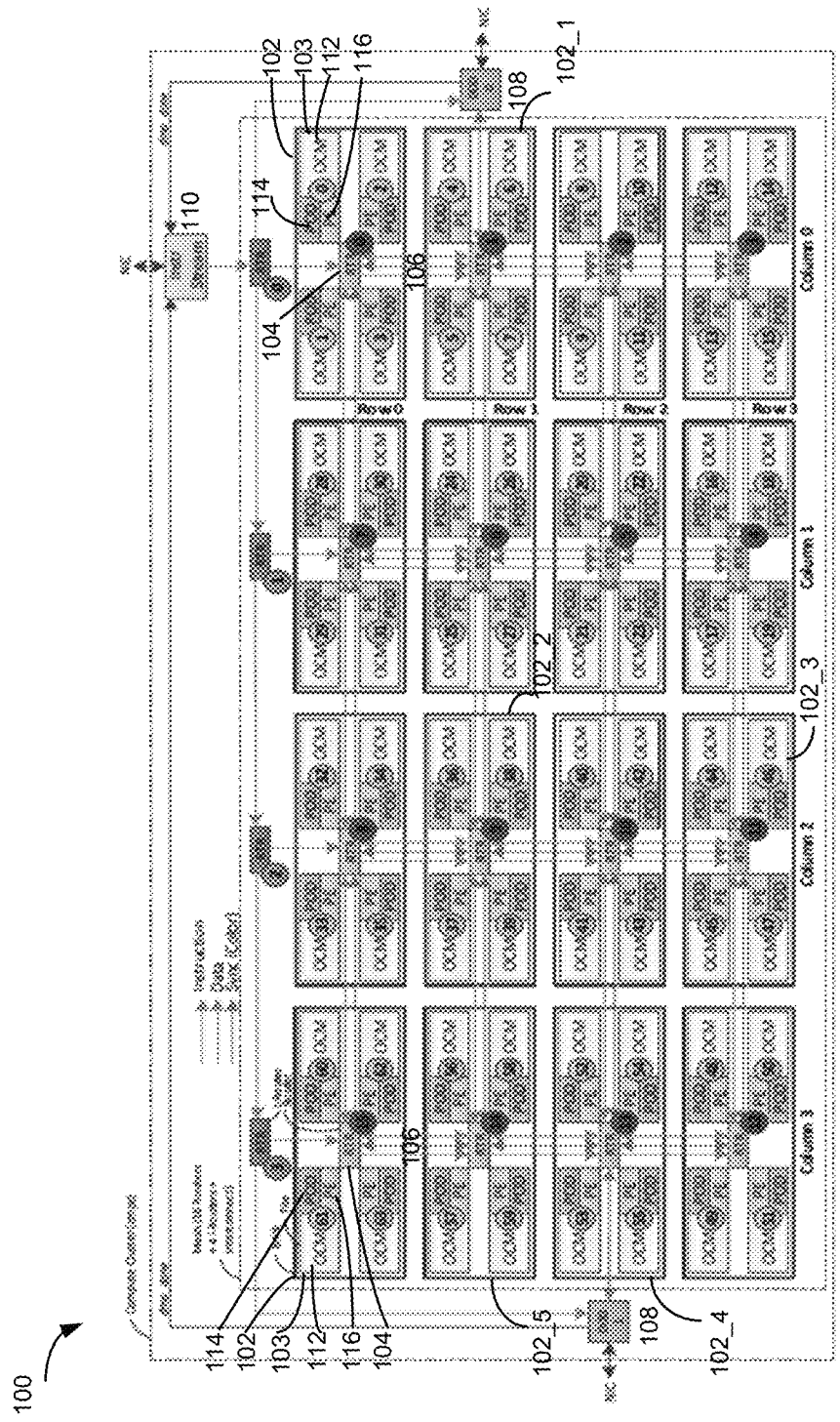
FIG. 1 depicts an example of a diagram of a hardware-based programmable mesh architecture configured to support high bandwidth multicast and broadcast for machine learning according to some embodiments of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates a multi-dimensional mesh architecture to support efficiently transmitting data packets from one source (e.g., a memory unit) to on-chip memories (OCMs) in a plurality of destinations (e.g., processing blocks/bricks/nodes) in multicasting (one to many) or broadcasting (one to all) modes without taking too much bandwidth Each data packet to be transmitted from a single source to multiple destinations carries a destination mask, wherein each bit in the destination mask represents a corresponding destination processing tile in the mesh architecture the data packet must be sent to. The data packet traverses through the mesh architecture from the source based on a routing scheme, the data packet reaches all destinations as set in the destination mask. During the process, the data packet is only replicated when it reaches a splitting processing block where the paths to two different destinations diverge (e.g., one destination in one column and another destination in a different column). The original and the replicated data packets are then routed in different directions (e.g., horizontal and vertical) until they reach their respective destinations.

Instead of multiplexing and routing separate data packets between the source and each of the destinations, which may cause higher latency on the data linkages (since each data linkage can only process one data packet per cycle), the proposed approach replicates the data packet only when necessary. Consequently, the proposed approach minimizes the amount of linkages/interconnects the data packets must traverse in the mesh architecture to the multiple destinations, which maximizes the bandwidth for block to block communications and relieves congestion in the mesh architecture compared to the prior approaches. As such, the proposed approach is very efficient for broadcast (one-to-all) and/or multicast (one-to-many) delivery of data packets.

Although data transmissions between a memory unit and processing blocks are used in the following discussions as a non-limiting example of source and/or destinations to illustrate the proposed approach, it is appreciated that the embodiments can equally be applied to multicasting and/or broadcasting of any other types of packets between any types of sources and destinations.

Although a two-dimensional hardware-based mesh architecture is used as a non-limiting example in the discussions below to illustrate the proposed approach to support high bandwidth multicast and broadcast for machine learning, it is appreciated that the same or similar approach can also be applied to a mesh architecture having three dimensions. It is also appreciated that although the following embodiments are described using a deterministic routing scheme such as an X-Y routing scheme as a non-limiting example, where packets first traversing horizontally (in X direction) and then vertically (in Y direction), such routing scheme is for illustrative purposes and should not be construed as limiting the scope of the embodiments. For a non-limiting example, it is appreciated that in some embodiments, other types of deterministic routing scheme, e.g., Y-X routing scheme where packets first traversing vertically (in Y direction) and then horizontally (in X direction) can also be used. In some embodiments, a non-deterministic routing scheme such as an adaptive routing scheme, which takes into account the data traffic congestion in real time when routing a packet, can also be adopted to route the packets to their destinations.

FIG. 1 depicts an example of a diagram of a hardware-based programmable mesh architecture 100 configured to support high bandwidth multicast and broadcast for machine learning. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the mesh architecture 100 includes a plurality of processing blocks/nodes 102s arranged in a two-dimensional array of a plurality of rows and columns, e.g., 4 rows by 4 columns as shown in FIG. 1. The mesh architecture 100 further includes a plurality of routers 104s associated with the processing blocks 102s (each comprising a set of processing tiles 103s) and a plurality of bi-directional linkages/interconnects 106s that interconnect the routers 104s of the processing blocks 102s in the mesh architecture 100 as well as DODs (DDR-OCM DMAs) 108s and instruction stream engine 110. Each of these components in the mesh architecture 100 is a dedicated hardware block/component programmable by a user at a host (not shown) through a PCIe interface via software instructions for various machine learning operations. When the software instructions are executed, each of the hardware components becomes a special purposed hardware component for practicing certain machine learning functions. In some embodiments, the mesh architecture 100 is on a single chip, e.g., a system-on-chip (SOC).

In the example of FIG. 1, each processing block 102 comprises a set of (e.g., four) processing tiles 103s, which are connected to one another via a router 104 to form the processing block 102. Each processing tile 103 further comprises at least an on-chip memory (OCM) 112 and one or more processing units, e.g., a first type of processing unit (e.g., POD) 114, and a second type of processing unit (e.g., PE) 116. Here, each OCM 112 in the processing tile 103 comprises one or more memory tiles/banks (not shown) and is configured to accept and maintain data in a streaming fashion for access by the processing units for various ML operations. The OCMs 112 enable efficient local access to data per processing tile 103.

In the example of FIG. 1, the mesh architecture 100 includes three main independent networks for transmitting programming instructions from the instruction streaming engine 110 to the processing blocks 102s, transmitting data packets among the processing blocks 102s and from a memory unit (not shown) to the processing blocks 102s via the DODs 108s, and for synchronizing operations of the processing blocks 102s and/or the instruction streaming engine 110, respectively, via the interconnects 106s In some embodiments, the three different networks are physically separated and do not share any resource such as the interconnects 106s and/or buffers. In some embodiments, the programming instructions always originate at the instruction streaming engine 110 and are consumed by the processing blocks 102s and/or the DODs 108s. In some embodiments, the data packets originate at the memory unit and get consumed at the DODs 108s and/or the processing blocks 102s.

In the example of FIG. 1, the mesh architecture 100 is configured to support multicasting and/or broadcasting of the programming instructions from one source (e.g., the instruction streaming engine 110) to a plurality of destinations (e.g., the DODs 108s and/or one or more of the processing blocks 102s), and/or the data packets from one source (e.g., one of the DODs 108s and/or the processing blocks 102s) to a plurality of destinations (e.g., the rest of the processing blocks 102s), respectively, via the routers 104s during the same clock cycle. In some embodiments, the mesh architecture 100 is configured to maintain an order of transactions (e.g., via FIFO queues) at the routers 104s for a given source-destination flow of instruction and/or data packets. In some embodiments, the mesh architecture 100 is stateless. i.e., the routers 104s in the mesh architecture 100 do not maintain any state that is used to transmit the packets (the routers maintain debug and statistics related state but those are not used to perform the routing).

In some embodiments, each of the DODs 108s is configured to transfer one or more data packets from a memory unit (e.g., a DDR memory) to the OCMs 112s of one or more processing blocks 102s via direct memory access (DMA). For each of the data packets being transferred, a destination mask or vector representing the destinations of the data packet is assigned and transferred with the data packet, wherein each bit of the destination mask corresponds to one of the processing tiles 103s in one of the processing blocks 102s. If a bit in the destination mask is set to 1, the data packet is to be transferred to the OCM 112 of the corresponding destination processing tile 103 (or destination processing block 102). In some embodiments, positions of the bits representing the processing tiles in the destination mask are ordered by their corresponding rows and columns in the two-dimensional array, e.g., rows and columns ordered from low to high. In some embodiments, the processing tile with the closest column number (e.g., the closest to the source) is marked as the first destination processing tile for the X-Y routing scheme discussed below. The data packet is to be delivered to the destination processing tiles as set by the bits in the destination mask (one bit per processing tile). In some embodiments, the bit width (measured in terms of number bits) of the destination mask may be adjusted and reduced as the data packet traverses through the processing tiles 103s and having fewer and fewer destinations to reach.

In some embodiments, once the data packet arrives at a first processing block 102_1 in the two-dimensional array with a destination mask, the routers 104s in the processing blocks 102s of the mesh architecture 100 are configured to route the data packet from one source to a plurality of destinations following a X-Y routing scheme, wherein the data packet is first routed by the routers 104s in the processing blocks 102s to traverse horizontally in the X direction across a number of columns of processing blocks 102s to arrive at a second/turning processing block 102_2, which is at the same column of the first destination. The data packet then takes a turn and is routed by the router 104 in the processing block 102_2 to traverse vertically in the Y direction across a number of rows of processing blocks 102s to arrive at the third processing block 102_3 at the first destination.

In some embodiments, if there are more than one destinations for the data packet, the router 104 at the second/turning processing block 102_2 is configured to check the destination mask to determine if the fourth processing block 102_4 at the second destination is at a same column as the third processing block 102_3 at the first destination. If so, the data packet will not be replicated. Otherwise, the second/turning processing block 102_2 becomes a splitting block/node and the router 104 at the second/turning processing block 102_2 is configured to replicate the data packet After replication, the original data packet makes a turn and traverses vertically in the Y direction to the third processing block 102_3 at the first destination as described above while the replicated data packet continues to traverse horizontally in the X direction until it reaches the fifth processing block 102_5, which is at the same column of the second destination. The replicated data packet then takes a turn and is routed by the routers 104s in the processing blocks 102s to traverse vertically in the Y direction across a number of rows of processing blocks 102s to arrive at the fourth processing block 102_4 at the second destination. Such process continues until all destinations specified in the destination mask have been reached. As such, each data packet (original or replicated) makes at most one turn during traversing (from X direction to Y direction) to reach its destination under the X-Y routing scheme.

In some embodiments, once a data packet reaches each of the destination processing blocks 102s, the router 104 of each of the destination processing blocks 102s is configured to switch, read, or write the data packet to the OCM 112 of each of the processing tiles 103s in the destination processing block 102 during the same clock cycle. For a non-limiting example, processing tiles #4-7 are all connected to the router in processing block #1 during clock cycle c, tile #4 is configured to send the data packet to tile #5. Tile #5 then sends the data packet to tile #6, and tile #6 then sends the data packet to tile #7. In addition, tile #3 (connected to a router in a neighboring processing block #0) may be sending another data packet to tile #4, which arrives at the router of processing block #1 during the same cycle c, wherein the router of processing block #1 is able to switch the data packet such that all data packets go to their respective tiles in the same cycle.

The following non-limiting example illustrates transmitting a data packet to multiple destinations in a 4×4 mesh architecture having a plurality of processing blocks organized in an array of 4 rows and 4 columns as depicted in FIG. 1 under the X-Y routing scheme described above First, a data packet is transmitted by DOD_0 to processing block #1 at (0, 1) in the array as shown by FIG. 1. A destination mask accompanying the data packet indicates that the data packet is to be transmitted/multicast to three destinations a first destination processing block #11 at (3,2), a second destination processing block #13 at (2,3), and a third destination processing block #12 at (3,3). The data packet is to be delivered to the destination processing blocks, which in some embodiments, can be in the order of their corresponding columns ordered from low to high followed by rows from low to high as shown in FIG. 1. Under the X-Y routing scheme, the data packet is first transmitted horizontally in the X direction to processing block #9 at (1, 2), which is at the same row as the source processing block #1 and the same column as the first destination of processing block #11. Since the destination processing blocks are at two different columns—processing block #11 is at Column 2 and processing blocks #12 and #13 are at Column 3, processing block #9 becomes a splitting processing block and the router in processing block #9 replicates the original (first) data packet to create a replicated (second) data packet Processing block #9 then routes the original data packet vertically in the Y direction to the first destination processing block #11 at (3, 2) and the replicated data packet horizontally in the X direction to processing block #14, which is at the same column of the second and the third destination processing blocks. Since both the second destination processing block #13 and the third destination processing block #12 share the same column, no replication of the data packet at processing block #14 is necessary. Processing block #14 then routes the replicated data packet in the Y direction to the second destination processing block #13 at Row 2, wherein the data packet is replicated again and routed to the third destination processing block #12 at Row 3. During the routing process, each data packet (original or replications) makes at most one turn (from X direction to Y direction) to reach its respective destination processing block(s) Instead of multiplexing and routing three data packets separately between the source (DOD 0) and the 3 destinations processing block #9, #14 and #13, which may cause higher latency on the data linkages 106s, the proposed scheme replicates the data packet only when necessary. As such, the proposed scheme results in less total traffic in the mesh architecture 100 while the total number of data packets (including original and replications) is the same as the number of destinations.

Figure 2:
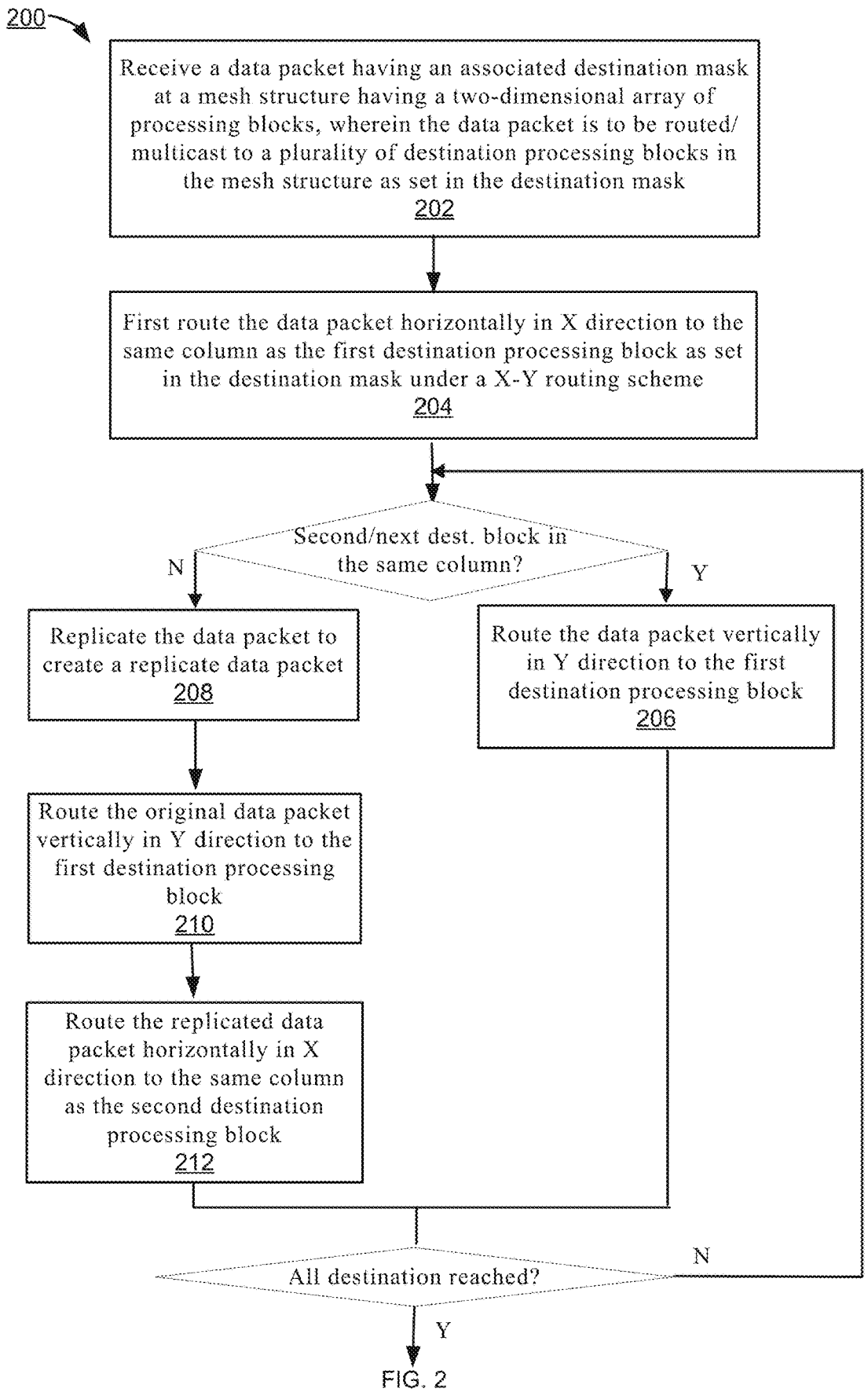
FIG. 2 depicts a flowchart of an example of a process to support high bandwidth multicast and broadcast for machine learning according to some embodiments of the present embodiments.

FIG. 2 depicts a flowchart 200 of an example of a process to support high bandwidth multicast and broadcast. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a data packet having an associated destination mask is received at a mesh structure having a two-dimensional array of processing blocks, wherein the data packet is to be routed/multicast to a plurality of destination processing blocks in the mesh structure as set in the destination mask. The flowchart 200 continues to block 204, where the data packet is first routed horizontally in X direction to the same column as the first destination processing block according to the order set in the destination mask under a X-Y routing scheme. If a second/next destination processing block is at the same column of the first/current destination processing block, the flowchart 200 continues to block 206, where the data packet is routed vertically in Y direction to the first destination processing block. If the second/next destination processing block is at a different column from the first/current destination processing block, the flowchart 200 continues to block 208, where the data packet is replicated to create a replicate data packet. The flowchart 200 continues to block 210, wherein the original data packet is routed vertically in Y direction to the first destination processing block. The flowchart 200 continues to block 212, wherein the replicated data packet is routed horizontally in X direction to the same column as the second destination processing block. The blocks 206-212 above are repeated until the data packet and/or its replicated data packets have reached all destination processing blocks set in the destination mask.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A hardware-based programmable mesh architecture to support high bandwidth multicast and broadcast for machine learning (ML), comprising:
    a plurality of processing blocks arranged in a two-dimensional array of a plurality of rows and columns;
    a plurality of routers associated with the plurality of processing blocks; and
    a plurality of bi-directional linkages that interconnect the plurality of routers of the processing blocks in the mesh architecture;
    wherein the mesh architecture is configured to
        i. accept a first data packet having an associated destination mask transferred from an external source at one processing block of the plurality of processing blocks, wherein the first data packet Is to be routed to a plurality of destination processing blocks in the mesh structure as set in the destination mask;
        ii. route the first data packet horizontally in X direction to the same column as a first destination processing block according to an order set in the destination mask under a X-Y routing scheme;
        iii. route the first data packet vertically in Y direction to the first destination processing block when a second/next destination processing block is at the same column of the first/current destination processing block;
        when the second/next destination processing block is at a different column from the first/current destination processing block,
        iv. replicate the first data packet to create a replicated second data packet;
        v. route the first data packet vertically in Y direction to the first destination processing block;
        vi. route the replicated second data packet horizontally in X direction to the same column as the second destination processing block;
        vii. repeat steps iii to vi until the data packet and/or its replicated data packets have reached all destination processing blocks set in the destination mask.

2. The hardware-based programmable mesh architecture of claim 1, wherein:
    each processing block of the plurality of processing blocks comprises a set of processing tiles connected to one another via one router of the plurality of routers to form the processing block.

3. The hardware-based programmable mesh architecture of claim 2, wherein:
    each of the processing tiles further comprises:
        an on-chip memory (OCM) comprising one or more memory tiles configured to accept and maintain data for access by one or more processing units for various ML operations;
        said one or more processing units configured to perform the various ML operations on the data maintained in the OCM.

4. The hardware-based programmable mesh architecture of claim 3, wherein:
    the router of each of the destination processing blocks is configured to switch, read, or write the data packet to the OCM of each of the processing tiles during the same clock cycle once the data packet reaches the destination processing block.

5. The hardware-based programmable mesh architecture of claim 2, wherein:
    each bit of the destination mask corresponds to one processing tile of the plurality of processing tiles, wherein when a bit in the destination mask is set to 1, the corresponding processing tile is one destination processing tile of the plurality of destination processing tiles.

6. The hardware-based programmable mesh architecture of claim 5, wherein:
    positions of bits representing the plurality of processing tiles in the destination mask are ordered by their corresponding rows and columns in the two-dimensional array.

7. The hardware-based programmable mesh architecture of claim 1, wherein:
    each component in each of the plurality of processing blocks and its associated router is programmed according to one or more programming instructions received from an instruction streaming engine.

8. The hardware-based programmable mesh architecture of claim 7, wherein:
    the mesh architecture includes three physically independent networks to, via the bi-directional linkages, respectively,
        transmit programming Instructions to the plurality of processing blocks;
        transmit data packets among the plurality of processing blocks and from a memory unit to the plurality of processing blocks;
        synchronize operations of the plurality of processing blocks.

9. The hardware-based programmable mesh architecture of claim 1, wherein:
    the first data packet transmitted from an external memory unit to the mesh architecture via direct memory access (DMA) by a DDR-OCM DMA (DOD) unit.

10. The hardware-based programmable mesh architecture of claim 1, wherein:
    each data packet makes at most one turn from X direction to Y direction to reach its one or more respective destination processing blocks under the X-Y routing scheme.

11. A hardware-based programmable mesh architecture to support high bandwidth multicast and broadcast for machine learning (ML), comprising:
    a plurality of processing blocks arranged in a two-dimensional array of a plurality of rows and columns;
    a plurality of routers associated with the plurality of processing blocks; and
    a plurality of bi-directional linkages that interconnect the plurality of routers of the processing blocks in the mesh architecture;
    wherein the mesh architecture is configured to
        i. accept a first data packet having an associated destination mask transferred from an external source at one processing block of the plurality of processing blocks, wherein the first data packet is to be routed to a plurality of destination processing blocks in the mesh structure as set in the destination mask;
        ii. route the first data packet vertically in Y direction to the same row as a first destination processing block according to an order set in the destination mask under a Y-X routing scheme;
        iii. route the first data packet horizontally in X direction to the first destination processing block when a second/next destination processing block is at the same row of the first/current destination processing block;

when the second/next destination processing block is at a different row from the first/current destination processing block,
    iv. replicate the first data packet to create a replicated second data packet;
    v. route the first data packet horizontally in X direction to the first destination processing block;
    vi. route the replicated second data packet vertically in Y direction to the same row as the second destination processing block;
    vii. repeat steps iii to vi until the data packet and/or its replicated data packets have reached all destination processing blocks set in the destination mask.

12. A hardware-based programmable mesh architecture to support high bandwidth multicast and broadcast for machine learning (ML), comprising:
    a plurality of processing blocks arranged in a multi-dimensional array of a plurality of dimensions;
    a plurality of routers associated with the plurality of processing blocks; and
    a plurality of bi-directional linkages that interconnect the plurality of routers of the processing blocks in the mesh architecture;
    wherein the mesh architecture is configured to
        i. accept a first data packet having an associated destination mask transferred from an external source at one processing block of the plurality of processing blocks, wherein the first data packet is to be routed to a plurality of destination processing blocks in the mesh structure as set in the destination mask;
        ii. route the first data packet in a first direction across a first set of processing blocks according to an order set in the destination mask under a routing scheme;
        iii. route the first data packet in a second direction across a second set of processing blocks to a first destination processing block when a second/next destination processing block is in the same dimension of the first/current destination processing block;
    when the second/next destination processing block is at a different dimension from the first/current destination processing block,
        iv. replicate the first data packet to create a replicated second data packet;
        v. route the first data packet in the second direction to the first destination processing block;
        vi. route the replicated second data packet in a third direction across a third set of processing blocks;
        vii. repeat steps ill to vi until the data packet and/or its replicated data packets have reached all destination processing blocks set in the destination mask.

13. The hardware-based Programmable mesh architecture of claim 12, wherein:
the routing scheme is an adaptive routing scheme, which takes into account data traffic congestion in realtime when routing the data packets to their destination processing blocks.

14. A method to support high bandwidth multicast and broadcast for machine learning (ML), comprising:
    i. accepting a first data packet having an associated destination mask transferred from an external source at one processing block of a plurality of processing blocks arranged in a two-dimensional array of a plurality of rows and columns of a programmable mesh architecture, wherein the first data packet is to be routed to a plurality of destination processing blocks in the mesh structure as set in the destination mask;
    ii. routing the first data packet horizontally in X direction to the same column as a first destination processing block according to an order set in the destination mask under a X-Y routing scheme;
    iii. routing the first data packet vertically in Y direction to the first destination processing block when a second/next destination processing block is at the same column of the first/current destination processing block;
when the second/next destination processing block is at a different column from the first/current destination processing block,
    iv. replicating the first data packet to create a replicated second data packet;
    v. routing the first data packet vertically in Y direction to the first destination processing block;
    vi. routing the replicated second data packet horizontally in X direction to the same column as the second destination processing block;
    vii. repeating steps Iii to vi until the data packet and/or its replicated data packets have reached all destination processing blocks set in the destination mask.

15. The method of claim 14, wherein:
each processing block of the plurality of processing blocks comprises a set of processing tiles connected to one another via one router of the plurality of routers to form the processing block.

16. The method of claim 15, wherein:
each of the processing tiles further comprises:
    an on-chip memory (OCM) comprising one or more memory tiles configured to accept and maintain data for access by one or more processing units for various ML operations;
    said one or more processing units configured to perform the various ML operations on the data maintained in the OCM.

17. The method of claim 16, further comprising:
switching, reading, or writing the data packet to the OCM of each of the processing tiles during the same clock cycle once the data packet reaches the destination processing block.

18. The method of claim 15, wherein:
each bit of the destination mask corresponds to one processing tile of the plurality of processing tiles, wherein if a bit in the destination mask is set to 1, the corresponding processing tile is one destination processing tile of the destination processing tiles.

19. The method of claim 18, further comprising:
ordering positions of bits representing the plurality of processing tiles in the destination mask by their corresponding rows and columns in the two-dimensional array.

20. The method of claim 14, further comprising:
programming each component in each of the plurality of processing blocks and its associated router according to one or more programming instructions received from an instruction streaming engine.

21. The method of claim 20, further comprising
transmitting programming instructions to the plurality of processing blocks;
transmitting data packets among the plurality of processing blocks and from a memory unit to the plurality of processing blocks;
synchronizing operations of the plurality of processing blocks;
via three physically independent networks.

22. The method of claim 14, further comprising:

transmitting the first data packet from an external memory unit to the mesh architecture via direct memory access (DMA).

23. The method of claim 14, further comprising:

enabling each data packet to make at most one turn from X direction to Y direction to reach its one or more respective destination processing blocks under the X-Y routing scheme.

24. A method to support high bandwidth multicast and broadcast for machine learning (ML), comprising:

i. accepting a first data packet having an associated destination mask transferred from an external source at one processing block of a plurality of processing blocks arranged in a two-dimensional array of a plurality of rows and columns of a programmable mesh architecture, wherein the first data packet is to be routed to a plurality of destination processing blocks in the mesh structure as set in the destination mask;

ii. routing the first data packet vertically in Y direction to the same row as a first destination processing block according to an order set in the destination mask under a Y-X routing scheme;

iii. routing the first data packet horizontally in X direction to the first destination processing block when a second/next destination processing block is at the same row of the first/current destination processing block;

when the second/next destination processing block is at a different row from the first/current destination processing block, iv. replicating the first data packet to create a replicated second data packet;

v. routing the first data packet horizontally in X direction to the first destination processing block;

vi. routing the replicated second data packet vertically in Y direction to the same row as the second destination processing block;

vii. repeating steps ill to vi until the data packet and/or its replicated data packets have reached all destination processing blocks set in the destination mask.

25. A method to support high bandwidth multicast and broadcast for machine learning (ML), comprising:

i. accepting a first data packet having an associated destination mask transferred from an external source at one processing block of a plurality of processing blocks arranged in a multi-dimensional array of a plurality of dimensions of a programmable mesh architecture, wherein the first data packet is to be routed to a plurality of destination processing blocks in the mesh structure asset in the destination mask;

ii. routing the first data packet in a first direction across a first set of processing blocks according to an order set in the destination mask under a routing scheme;

iii. routing the first data packet in a second direction across a second set of processing blocks to a first destination processing block when a second/next destination processing block is in the same dimension of the first/current destination processing block;

when the second/next destination processing block is at a different dimension from the first/current destination processing block, iv. replicating the first data packet to create a replicated second data packet; v. routing the first data packet in the second direction to the first destination processing block;

vi. routing the replicated second data packet in a third direction across a third set of processing blocks;

vii. repeating steps iii to vi until the data packet and/or its replicated data packets have reached all destination processing blocks set in the destination mask.

26. The method of claim 25, wherein:

the routing scheme is an adaptive routing scheme, which takes into account data traffic congestion in real time when routing the data packets to their destination processing blocks.

* * * * *